(12) United States Patent  
McLachlan et al.

(10) Patent No.: US 9,275,050 B2  
(45) Date of Patent: Mar. 1, 2016

(54) GLOBAL DICTIONARIES USING UNIVERSAL PRIMITIVES

(71) Applicant: APPTIO, INC., Bellevue, WA (US)

(72) Inventors: Paul Damien McLachlan, Newcastle, WA (US); Tavis Dean Elliott, Bothell, WA (US)

(73) Assignee: Apptio, Inc., Bellevue, WA (US)

( * ) Notice: Subject to any disclaimer, the term of this patent is extended or adjusted under 35 U.S.C. 154(b) by 490 days.

(21) Appl. No.: 13/649,019

(22) Filed: Oct. 10, 2012

(65) Prior Publication Data

US 2013/0103654 A1    Apr. 25, 2013

Related U.S. Application Data

(60) Provisional application No. 61/550,609, filed on Oct. 24, 2011.

(51) Int. Cl.  
*G06F 17/30* (2006.01)

(52) U.S. Cl.  
CPC .... *G06F 17/30002* (2013.01); *G06F 17/30321* (2013.01); *G06F 17/30371* (2013.01); *G06F 17/30424* (2013.01)

(58) Field of Classification Search  
CPC .................................................. G06F 17/30321  
See application file for complete search history.

(56) References Cited

U.S. PATENT DOCUMENTS

| | | |
|---|---|---|
| 4,744,026 A | 5/1988 | Vanderbei |
| 5,249,120 A | 9/1993 | Foley |
| 5,721,919 A | 2/1998 | Morel et al. |
| 5,799,286 A | 8/1998 | Morgan et al. |
| 5,802,508 A | 9/1998 | Morgenstern |
| 5,970,476 A | 10/1999 | Fahey |
| 5,991,741 A | 11/1999 | Speakman et al. |
| 6,014,640 A | 1/2000 | Bent |

(Continued)

FOREIGN PATENT DOCUMENTS

JP    2011134268 A    7/2011

OTHER PUBLICATIONS

International Search Report and Written Opinion for International Patent Application No. PCT/US2012/028353 mailed Oct. 31, 2012.

(Continued)

*Primary Examiner* — Kris Mackes  
(74) *Attorney, Agent, or Firm* — John W. Branch; Lowe Graham Jones PLLC

(57) ABSTRACT

Embodiments are directed towards managing data storage and queries within a database system using global dictionaries with universal primitives (UNIPs) to represent non-numeric data within a mixed numeric/non-numeric environment. Common data types are managed within a same global dictionary through dictionaries that are globally used within the database system. At least non-numeric data within mixed data fields may be stored using a UNIP to identify the stored non-numeric data. The UNIP may take advantage of the IEEE-754 standard for floating point data representation by setting a first field within the UNIP to 0x7ff (HEX) to indicate that the data is non-numeric (NaN) and using remaining bits to store typed data, such as a date or unique indirect reference (e.g. a sequence number or file offset to larger piece of data). The UNIP may then replace the data within the database and be used during operations performed on the data.

20 Claims, 6 Drawing Sheets

(56) References Cited

U.S. PATENT DOCUMENTS

| | | | |
|---|---|---|---|
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1* | 7/2002 | Gruenwald | 707/802 |
| 6,507,825 B2 | 1/2003 | Suh | |
| 6,578,005 B1 | 6/2003 | Lesaint et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,308,427 B1 | 12/2007 | Hood | |
| 7,321,869 B1 | 1/2008 | Phibbs, Jr. | |
| 7,590,937 B2 | 9/2009 | Jacobus et al. | |
| 7,634,431 B2 | 12/2009 | Stratton | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,774,458 B2 | 8/2010 | Trinon et al. | |
| 7,783,759 B2 | 8/2010 | Eilam et al. | |
| 7,813,948 B2 | 10/2010 | Ratzloff | |
| 7,877,742 B2 | 1/2011 | Duale et al. | |
| 7,899,235 B1 | 3/2011 | Williams et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 8,010,584 B1 | 8/2011 | Craver et al. | |
| 8,024,241 B2 | 9/2011 | Bailey et al. | |
| 8,175,863 B1 | 5/2012 | Ostermeyer et al. | |
| 8,200,518 B2 | 6/2012 | Bailey et al. | |
| 8,209,218 B1 | 6/2012 | Basu et al. | |
| 8,260,959 B2 | 9/2012 | Rudkin et al. | |
| 8,370,243 B1 | 2/2013 | Cernyar | |
| 8,423,428 B2 | 4/2013 | Grendel et al. | |
| 8,484,355 B1 | 7/2013 | Lochhead et al. | |
| 8,601,263 B1* | 12/2013 | Shankar et al. | 713/166 |
| 8,768,976 B2 | 7/2014 | McLachlan et al. | |
| 2002/0002557 A1 | 1/2002 | Straube et al. | |
| 2002/0016752 A1 | 2/2002 | Suh | |
| 2002/0069102 A1 | 6/2002 | Vellante et al. | |
| 2002/0123945 A1 | 9/2002 | Booth et al. | |
| 2002/0145040 A1 | 10/2002 | Grabski, III | |
| 2002/0156710 A1 | 10/2002 | Ryder | |
| 2002/0178198 A1* | 11/2002 | Steele, Jr. | 708/495 |
| 2003/0083888 A1 | 5/2003 | Argenton et al. | |
| 2003/0139960 A1 | 7/2003 | Nishikawa et al. | |
| 2003/0139986 A1 | 7/2003 | Roberts, Jr. | |
| 2003/0158724 A1* | 8/2003 | Uchida | G06Q 10/107 704/7 |
| 2003/0158766 A1 | 8/2003 | Mital et al. | |
| 2003/0172368 A1 | 9/2003 | Alumbaugh et al. | |
| 2003/0195780 A1 | 10/2003 | Arora et al. | |
| 2003/0236721 A1 | 12/2003 | Plumer et al. | |
| 2004/0059611 A1 | 3/2004 | Kananghinis et al. | |
| 2004/0093344 A1 | 5/2004 | Berger et al. | |
| 2004/0111509 A1 | 6/2004 | Eilam et al. | |
| 2004/0186762 A1 | 9/2004 | Beaven et al. | |
| 2004/0243438 A1 | 12/2004 | Mintz | |
| 2005/0004856 A1 | 1/2005 | Brose et al. | |
| 2005/0060298 A1 | 3/2005 | Agapi et al. | |
| 2005/0060317 A1 | 3/2005 | Lott et al. | |
| 2005/0120032 A1 | 6/2005 | Liebich et al. | |
| 2005/0171918 A1 | 8/2005 | Eden et al. | |
| 2006/0041458 A1 | 2/2006 | Ringrose et al. | |
| 2006/0080264 A1 | 4/2006 | Zhang et al. | |
| 2006/0085302 A1 | 4/2006 | Weiss et al. | |
| 2006/0085465 A1 | 4/2006 | Nori et al. | |
| 2006/0106658 A1 | 5/2006 | Johanson et al. | |
| 2006/0161879 A1 | 7/2006 | Lubrecht et al. | |
| 2006/0167703 A1 | 7/2006 | Yakov | |
| 2006/0178960 A1 | 8/2006 | Lepman | |
| 2006/0179012 A1 | 8/2006 | Jacobs | |
| 2006/0190497 A1 | 8/2006 | Inturi et al. | |
| 2006/0200477 A1 | 9/2006 | Barrenechea | |
| 2006/0212334 A1 | 9/2006 | Jackson | |
| 2006/0224946 A1 | 10/2006 | Barrett et al. | |
| 2006/0228654 A1 | 10/2006 | Sanjar et al. | |
| 2006/0282429 A1 | 12/2006 | Hernandez-Sherrington et al. | |
| 2007/0113289 A1 | 5/2007 | Blumenau | |
| 2007/0124162 A1 | 5/2007 | Mekyska | |
| 2007/0198982 A1 | 8/2007 | Bolan et al. | |
| 2007/0214413 A1 | 9/2007 | Boeckenhauer | |
| 2007/0226090 A1 | 9/2007 | Stratton | |
| 2007/0260532 A1 | 11/2007 | Blake, III | |
| 2007/0271203 A1 | 11/2007 | Delvat | |
| 2007/0276755 A1 | 11/2007 | Rapp | |
| 2007/0282626 A1 | 12/2007 | Zhang et al. | |
| 2008/0033774 A1 | 2/2008 | Kimbrel et al. | |
| 2008/0065435 A1 | 3/2008 | Ratzloff | |
| 2008/0071844 A1 | 3/2008 | Gopal et al. | |
| 2008/0201269 A1 | 8/2008 | Hollins et al. | |
| 2008/0295096 A1 | 11/2008 | Beaty et al. | |
| 2008/0312979 A1 | 12/2008 | Lee et al. | |
| 2009/0012986 A1 | 1/2009 | Arazi et al. | |
| 2009/0018880 A1 | 1/2009 | Bailey et al. | |
| 2009/0100017 A1 | 4/2009 | Graves et al. | |
| 2009/0100406 A1 | 4/2009 | Greenfield et al. | |
| 2009/0144120 A1 | 6/2009 | Ramachandran | |
| 2009/0150396 A1 | 6/2009 | Elisha et al. | |
| 2009/0198535 A1 | 8/2009 | Brown et al. | |
| 2009/0216580 A1 | 8/2009 | Bailey et al. | |
| 2009/0234892 A1* | 9/2009 | Anglin et al. | 707/201 |
| 2009/0300173 A1 | 12/2009 | Bakman et al. | |
| 2009/0319316 A1 | 12/2009 | Westerfeld et al. | |
| 2010/0005014 A1 | 1/2010 | Castle et al. | |
| 2010/0005173 A1 | 1/2010 | Baskaran et al. | |
| 2010/0042455 A1 | 2/2010 | Liu et al. | |
| 2010/0082380 A1 | 4/2010 | Merrifield, Jr. et al. | |
| 2010/0094740 A1 | 4/2010 | Richter | |
| 2010/0125473 A1 | 5/2010 | Tung et al. | |
| 2010/0169477 A1 | 7/2010 | Stienhans et al. | |
| 2010/0211667 A1 | 8/2010 | O'Connell, Jr. | |
| 2010/0250419 A1 | 9/2010 | Ariff et al. | |
| 2010/0250421 A1 | 9/2010 | Ariff et al. | |
| 2010/0250642 A1 | 9/2010 | Yellin et al. | |
| 2010/0293163 A1 | 11/2010 | McLachlan | |
| 2010/0299233 A1 | 11/2010 | Licardi et al. | |
| 2010/0306382 A1 | 12/2010 | Cardosa et al. | |
| 2010/0325606 A1 | 12/2010 | Sundararajan et al. | |
| 2010/0332262 A1 | 12/2010 | Horvitz et al. | |
| 2010/0333109 A1 | 12/2010 | Milnor | |
| 2011/0016214 A1 | 1/2011 | Jackson | |
| 2011/0016448 A1 | 1/2011 | Bauder et al. | |
| 2011/0022861 A1 | 1/2011 | Agneeswaran et al. | |
| 2011/0066628 A1* | 3/2011 | Jayaraman | 707/758 |
| 2011/0106691 A1 | 5/2011 | Clark et al. | |
| 2011/0167034 A1 | 7/2011 | Knight et al. | |
| 2011/0225277 A1 | 9/2011 | Freimuth et al. | |
| 2012/0023170 A1 | 1/2012 | Matignon et al. | |
| 2012/0066020 A1 | 3/2012 | Moon et al. | |
| 2012/0131591 A1 | 5/2012 | Moorthi et al. | |
| 2012/0150736 A1 | 6/2012 | Dickerson et al. | |
| 2012/0232947 A1 | 9/2012 | McLachlan et al. | |
| 2012/0233217 A1 | 9/2012 | Purpus et al. | |
| 2012/0233547 A1 | 9/2012 | McLachlan | |
| 2013/0041819 A1 | 2/2013 | Khasho | |
| 2013/0060595 A1 | 3/2013 | Bailey | |
| 2013/0138470 A1 | 5/2013 | Goyal et al. | |
| 2013/0179371 A1 | 7/2013 | Jain et al. | |
| 2013/0201193 A1 | 8/2013 | McLachlan et al. | |
| 2013/0282537 A1 | 10/2013 | Snider | |

(56) References Cited

U.S. PATENT DOCUMENTS

2013/0346390 A1    12/2013  Jerzak et al.
2014/0067632 A1     3/2014  Curtis

OTHER PUBLICATIONS

International Search Report and Written Opinion for International Patent Application No. PCT/US2012/028378 mailed on Sep. 12, 2012.
Official Communication for U.S. Appl. No. 12/467,120 mailed Jun. 20, 2012.
Official Communication for U.S. Appl. No. 12/467,120 mailed Aug. 29, 2012.
Official Communication for U.S. Appl. No. 13/324,253 mailed Sep. 25, 2012.
Official Communication for U.S. Appl. No. 13/452,628 mailed Nov. 18, 2013.
Official Communication for U.S. Appl. No. 14/033,130 mailed Dec. 16, 2013.
Official Communication for U.S. Appl. No. 13/324,253 mailed Jan. 23, 2014.
Official Communication for U.S. Appl. No. 13/675,837 mailed Jan. 31, 2014.
Official Communication for U.S. Appl. No. 13/917,503 mailed Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20 2011 http://www.slideshare.net/harishganesan/auto-scaling-using-amazon-web-services-aws.
Official Communication for U.S. Appl. No. 12/467,120 mailed Oct. 4, 2011.
International Search Report and Written Opinion for International Patent Application No. PCT/US2010/035021 mailed Jul. 14, 2010.
International Preliminary Report on Patentability for International Patent Application No. PCT/US2010/035021 mailed Nov. 24, 2011.
"Program Evaluation and Review Technique," VVikipedia, the free encyclopedia, accessed Mar. 13, 2012, 10 pages http://en.wikipedia.org/wiki/Program_Evaluation_and_Review_Technique—last modified Mar. 12, 2012.
"Project management," Wikipedia, the free encyclopedia, accessed Mar. 13, 2012, 14 pages http://en.wikipedia.org/wiki/Project_management—last modified Mar. 7, 2012.
"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#. Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#. Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.
"Visualization for Production Management: Treemap and Fisheye Table Browser," Open-Video Organization webpages, 2001, 2 pages http://www.open-video.org/details.php?videoid=4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds," The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Preliminary Report on Patentability for International Patent Application No. PCT/US2012/028353 mailed Sep. 19, 2013.
International Preliminary Report on Patentability for International Patent Application No. PCT/US2012/028378 mailed Sep. 19, 2013.
Official Communication for U.S. Appl. No. 12/467,120 mailed Oct. 23, 2013.
Official Communication for U.S. Appl. No. 13/324,253 mailed Sep. 6, 2013.
Official Communication for U.S. Appl. No. 13/415,797 mailed Oct. 3, 2013.
Official Communication for U.S. Appl. No. 13/675,837 mailed Oct. 10, 2013.
Official Communication for U.S. Appl. No. 13/837,815 mailed Oct. 23, 2013.
Official Communication for U.S. Appl. No. 13/917,478 mailed Nov. 7, 2013.
Official Communication for U.S. Appl. No. 13/917,503 mailed Oct. 10, 2013.
Official Communication for U.S. Appl. No. 13/935,147 mailed Oct. 22, 2013.
"Notice from the European Patent Office dated Oct. 1, 2007 concerning business methods," Official Journal EPO, Nov. 2007, pp. 592-593.
Extended European Search Report in EP Application No. 13151967.0-1955, mailed Apr. 19, 2013.
Official Communication for U.S. Appl. No. 12/467,120 mailed Mar. 26, 2013.
Official Communication for U.S. Appl. No. 13/324,253 mailed Jan. 10, 2013.
Official Communication for U.S. Appl. No. 13/324,253 mailed Mar. 19, 2013.

(56) References Cited

OTHER PUBLICATIONS

Official Communication for U.S. Appl. No. 13/452,628 mailed Apr. 22, 2013.
International Search Report and Written Opinion for International Application No. PCT/US2012/028353 mailed Mar. 8, 2012.
Extended European Search Report in EP Application No. 14159413.5 mailed Jul. 4, 2014.
Office Communication for U.S. Appl. No. 13/452,628 mailed Mar. 13, 2014.
Office Communication for U.S. Appl. No. 14/180,308 mailed Apr. 8, 2014.
Office Communication for U.S. Appl. No. 14/180,308 mailed Sep. 2, 2014.
Office Communication for U.S. Appl. No. 14/033,130 mailed on Aug. 5, 2014.
Office Communication for U.S. Appl. No. 14/033,130 mailed on May 27, 2014.
Office Communication for U.S. Appl. No. 13/935,147 mailed on Jun. 16, 2014.
Office Communication for U.S. Appl. No. 13/935,147 mailed on Apr. 11, 2014.
Office Communication for U.S. Appl. No. 13/675,837 mailed on Jan. 31, 2014.
SAS Activity-Based Management, 2010, Fact Sheet, 4 pages.
Office Communication for U.S. Appl. No. 13/415,797 mailed on Apr. 9, 2014.
Office Communication for U.S. Appl. No. 13/917,503 mailed Apr. 3, 2014.
Office Communication for U.S. Appl. No. 14/180,308 mailed Jan. 30, 2015.
Office Communication for U.S. Appl. No. 13/365,150 mailed on Dec. 3, 2014.
Office Communication for U.S. Appl. No. 13/452,628 mailed on Oct. 1, 2014.
Office Communication for U.S. Appl. No. 13/415,797 mailed on Jan. 12, 2015.
Office Communication for U.S. Appl. No. 13/837,815 mailed on Apr. 7, 2014.
Office Communication for U.S. Appl. No. 13/675,837 mailed on Apr. 2, 2014.
Office Communication for U.S. Appl. No. 13/837,815 mailed Sep. 25, 2014.
Office Communication for U.S. Appl. No. 13/324,253 mailed on Apr. 9, 2014.
Office Communication for U.S. Appl. No. 13/324,253 mailed on Oct. 24, 2014.
Office Communication for U.S. Appl. No. 12/467,120 mailed on Oct. 4, 2011.
Office Communication for U.S. Appl. No. 13/324,253 mailed on Feb. 19, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
European Search Report for Application No. 12755613.2 mailed on Jan. 26, 2015.
Office Communication for U.S. Appl. No. 13/452,628 mailed on Mar. 30, 2015.
Office Communication for U.S. Appl. No. 14/180,308 mailed on Apr. 17, 2015.
Office Communication for U.S. Appl. No. 13/917,503 mailed on Apr. 16, 2015.
Office Communication for U.S. Appl. No. 13/675,837 mailed on Apr. 16, 2015.
Office Communication for U.S. Appl. No. 13/837,815 mailed on Apr. 27, 2015.
Office Communication for U.S. Appl. No. 13/452,628 mailed on Jun. 23, 2015.
Office Communication for U.S. Appl. No. 13/415,797 mailed Jul. 23, 2015.
International Search Report and Written Opinion for PCT/US2015/015486 mailed Jun. 29, 2015.
Office Communication for U.S. Appl. No. 13/935,147 mailed Jul. 9, 2015.

\* cited by examiner

```xml
<?xml version="1.0"?>

<rdf:RDF
xmlns:rdf="http://www.w3.org/1999/02/22-rdf-syntax-ns#"
xmlns:tx="http://apptio.com/tx#">
<rdf:Description rdf:about="http://apptio.com/tx/77">
   <tx:date>5/4/2010</tx:date>
   <tx:person>http://apptio.com/em/BobZ</tx:person>
   <tx:amount>32.73</tx:amount>
</rdf:Description>
<rdf:Description rdf:about="http://apptio.com/tx/78">
   <tx:date>5/5/2010</tx:date>
   <tx:person>http://apptio.com/em/BobZ</tx:person>
   <tx:amount>883.01</tx:amount>
</rdf:Description>
<rdf:Description rdf:about="http://apptio.com/tx/79">
   <tx:date>5/6/2010</tx:date>
   <tx:person>http://apptio.com/em/Pete</tx:person>
   <tx:amount>$21.22</tx:amount>
</rdf:Description>
<rdf:Description rdf:about="http://apptio.com/tx/80">
   <tx:date>5/9/2010</tx:date>
   <tx:person>http://apptio.com/em/Pete</tx:person>
   <tx:amount>1,892.99</tx:amount>
</rdf:Description>
<rdf:Description rdf:about="http://apptio.com/tx/81">
   <tx:date>5/10/2010</tx:date>
   <tx:person>http://apptio.com/em/Pete</tx:person>
   <tx:amount>123.22</tx:amount>
</rdf:Description>
<rdf:Description rdf:about="http://apptio.com/em/George">
   <tx:manager>http://apptio.com/em/Pete</tx:manager>
</rdf:Description>
<rdf:Description rdf:about="http://apptio.com/em/Pete">
   <tx:manager>http://apptio.com/em/Zoey</tx:manager>
</rdf:Description>
<rdf:Description rdf:about="http://apptio.com/em/Lisa">
   <tx:manager>http://apptio.com/em/Zoey</tx:manager>
</rdf:Description>
<rdf:Description rdf:about="http://apptio.com/em/BobZ">
   <tx:manager>http://apptio.com/em/Pete</tx:manager>
</rdf:Description>
<rdf:Description rdf:about="http://apptio.com/em/Paul">
   <tx:manager>http://apptio.com/em/Pete</tx:manager>
</rdf:Description>

</rdf:RDF>
```

*FIG. 5*

Non-Numeric UNIP overlaid bit format
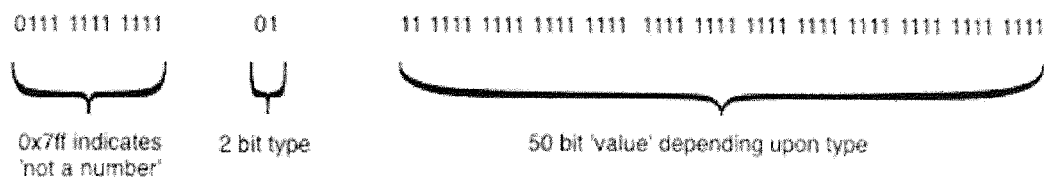
For Strings (type 00) and Sets (type 10)
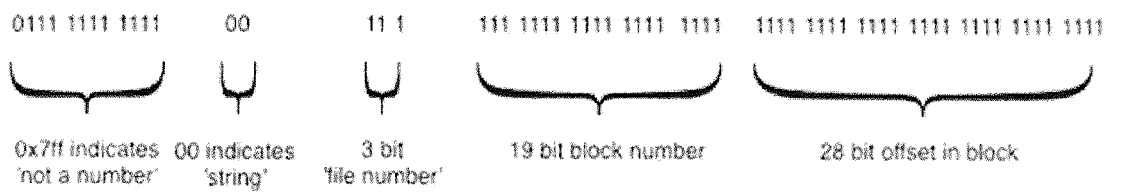
For Dates (type 01)
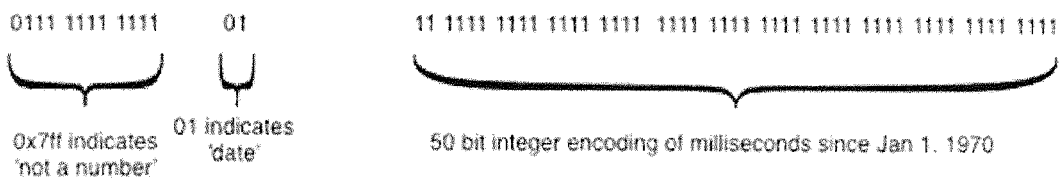
For Advanced Types (type 11)
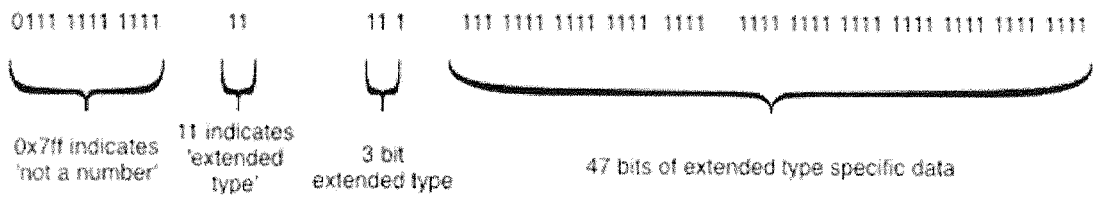
*FIG. 6*

GLOBAL DICTIONARIES USING UNIVERSAL PRIMITIVES

CROSS REFERENCE

This application is a Non-Provisional patent application of U.S. Provisional Patent Application No. 61/550,609, filed Oct. 24, 2011, entitled "Global Dictionaries Using Universal Primitives," the benefit of the earlier filing date of which is hereby claimed under 35 U.S.C. §119(e) and which is further incorporated herein by reference in its entirety.

TECHNICAL FIELD

The subject innovations disclosed herein relate generally to data management systems, and, more particularly, but not exclusively to managing resource efficiencies within data storage systems having mixed numeric and non-numeric data by employing global dictionaries using universal primitives for managing non-numeric data, the universal primitive takes advantage of features of the IEEE Standard for Floating-Point Arithmetic (IEEE-754).

BACKGROUND

Today's computing environments typically include database systems that may be tasked to manage large quantities of data. Because of the sheer volume of data that is expected to be stored and managed by today's database systems, there is often a desire by the database managers to store the data in a way the reduces resource requirements, such as hardware computer storage requirements, data access requirements, and so forth. One traditional mechanism that may be used to reduce resource requirements is to compress the data by using various techniques. For example, one such technique is known as a Run-Length Encoding Compression technique. In this compression technique, duplicated data values may be replaced by some value representing the duplicated data and a count indicating a number of times the data is duplicated. This technique is often useful when the data contains many 'runs' of duplicate data, such as might arise in data that represents images, or the like. However, where the data doesn't include many 'runs' of duplicate data, the Run-Length Encoding technique may actually increase storage size requirements. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 5 illustrates one embodiment of a non-limiting, non-exhaustive example of encoding a transaction/employee model using a semantic Resource Description Framework (RDF); and FIG. 6 illustrates non-limiting, non-exhaustive examples of universal primitives (UNIPs).

DETAILED DESCRIPTION

Figure 1:
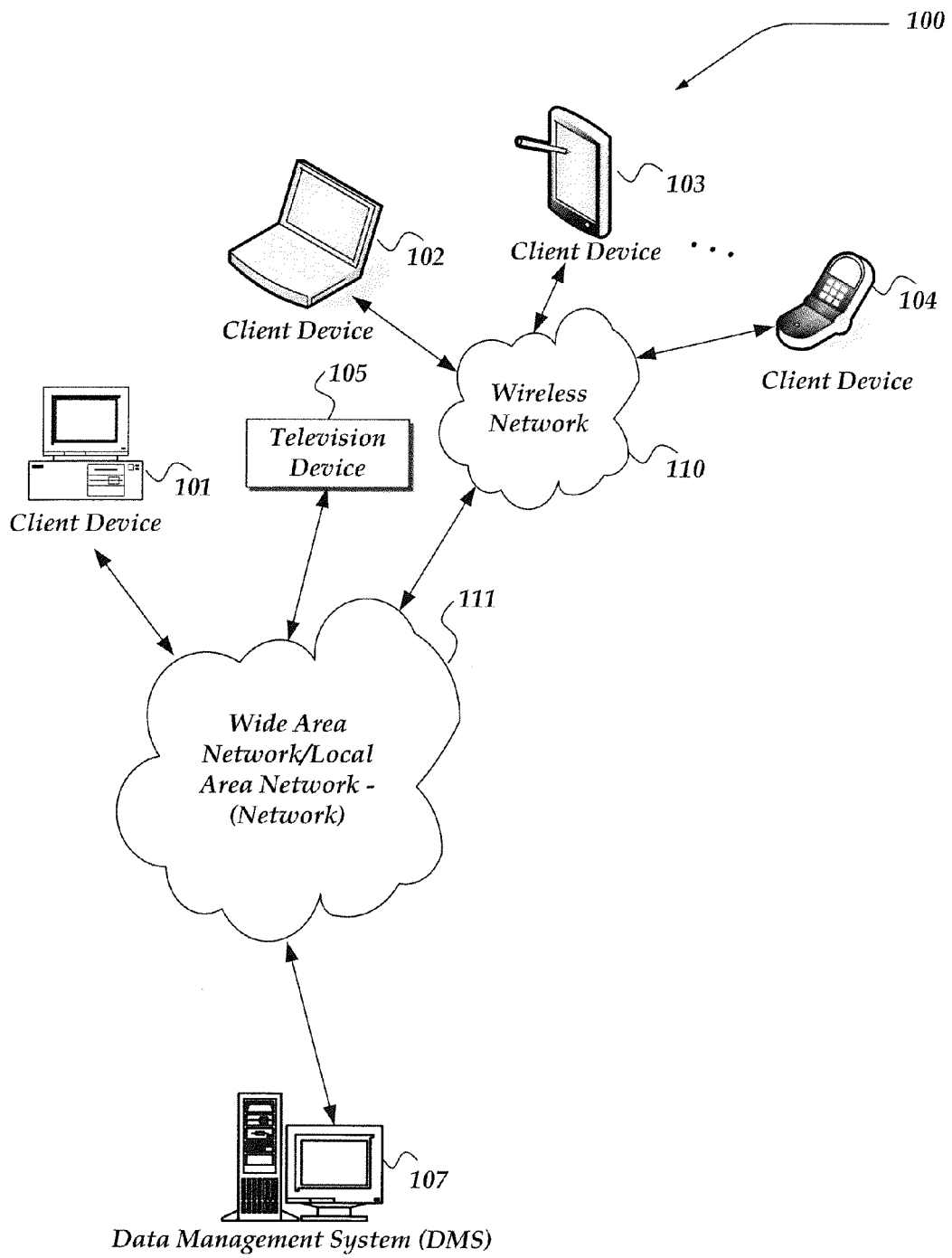
FIG. 1 is a system diagram of one embodiment of an environment in which the invention may be practiced.

The subject innovation now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the present embodiments are directed towards providing an efficient mechanism for managing data storage and data queries using global dictionaries with universal primitives (UNIP) to represent at least non-numeric data within a mixed numeric/non-numeric data storage environment. In one embodiment, rather than managing multiple distinct table entries within a data management system for selected data types, common data types may be managed within a same global dictionary. As described further below, where, for example, names of persons, business, or other non-numeric data fields are identified within a database system, storage usage may be compressed by combining the data through common dictionaries that may then be globally used within the database system. Further, where common data fields may include mixed numeric and non-numeric data, data manipulation may be difficult. Therefore as disclosed herein, for non-numeric data within these mixed data fields, data may be stored using a universal primitive (UNIP) to identify the stored non-numeric data, its storage location, and other characteristics. The universal primitive may then be used to replace the non-numeric data within the database. In one embodiment, the universal primitive may be employed as a key within the global dictionaries. In some embodiments, the universal primitive is created to take advantage of the Institute of Electrical and Electronics Engineers (IEEE) Standard for Floating-Point Arithmetic (IEEE-754), which is available from the IEEE, and is incorporated herein in its entirety. Using the IEEE-754 standard at least some fields within the data representation may be manipulated to uniquely represent non-numeric data. For example, in some embodiments, the universal primitive may be a 64-bit data type representation using the IEEE-754 standard for doubles. In one embodiment, non-numeric data within the database may be representative by setting a first field within the 64-bit universal primitive to 0x7ff (HEX) to indicate that the data is non-numeric (e.g., not-a-number or "NaN"). Other fields with the 64-bit universal primitive may be identified to represent other characteristics of the data, including, a type of the data, a storage location/block/offset or so forth for the data. The universal primitive may then replace the data within the database, and be used during queries, comparisons, or the like, performed on the data. That is, by representing non-numeric data using the IEEE-754 operations such as comparisons, sorts, or the like, may be performed across the entire database more efficiently (e.g., without additional translation steps). It should be recognized that while the above discloses using a 64-bit data types, other embodiments may use longer or shorter length data types.

Illustrative Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")—(network) 111, wireless network 110, client devices 101-105, and Data Management System (DMS) 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like, to display and send a message. In one embodiment, a user of the client device may employ the browser application to perform various actions over a network. For example, a user may employ one of client devices 101-105 to manage data stored or otherwise managed through DMS 107. A user might, for example, enter various types of data into a data management system accessible through DMS 107, where the data may be heavily interrelated as might arise within business systems, spreadsheet type data, or the like. The user might then perform any of a variety of actions on the data, including, queries, comparisons, summations, analysis, or the like, as might be expected within typical database systems.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, DMS 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 2:
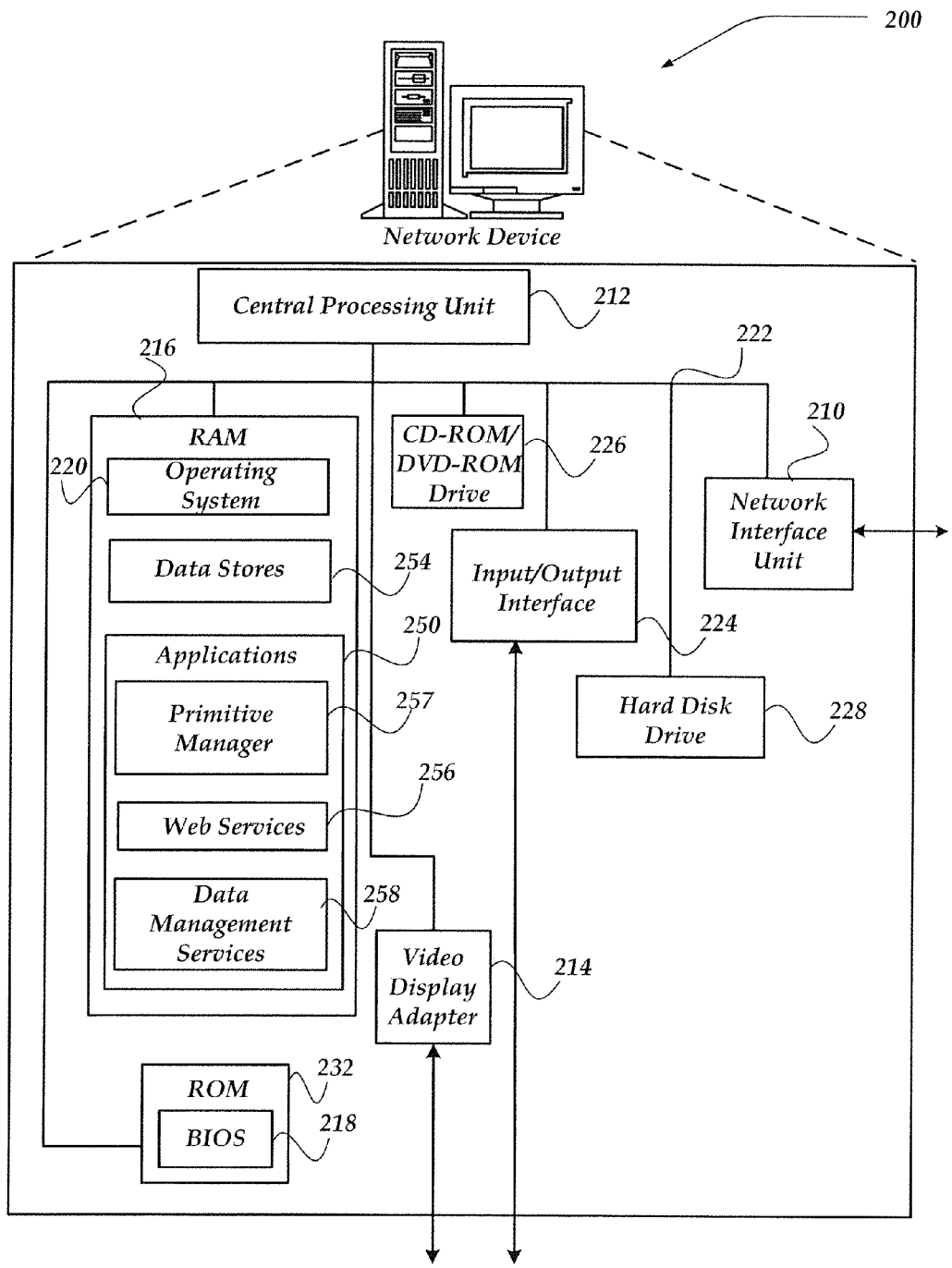
FIG. 2 shows one embodiment of a network device that may be included in a system implementing the invention.

DMS 107 may include virtually any network device usable to provide data management services, such as network device 200 of FIG. 2. In one embodiment, DMS 107 employs various techniques to efficiently manage the storage of the data, including as described herein, global dictionaries to compress data storage, speed up joins and pre-aggregation or index creation as well as improve query response times. Additionally, universal primitives, as described herein, can be used to efficiently manage mixed numeric and non-numeric data. In one embodiment, DMS 107 might receive, combine, and/or otherwise make use of the global dictionaries having the universal primitives. Generation of universal primitives may be performed, in one embodiment, using a process such as described below in conjunction with FIGS. 3-4.

Devices that may operate as DMS 107 include various network devices, including, but not limited to personal computers, desktop computers, multiprocessor systems, microprocessor-based or programmable consumer electronics, network PCs, server devices, network appliances, and the like. It should be noted that while DMS 107 is illustrated as a single network device, the invention is not so limited. Thus, in another embodiment, DMS 107 may represent a plurality of network devices. For example, in one embodiment, DMS 107 may be implemented using a cloud architecture, being distributed over a plurality of network devices.

Moreover, DMS 107 is not limited to a particular configuration. Thus, DMS 107 may operate using a master/slave approach over a plurality of network devices, within a cluster architecture, a peer-to-peer architecture, and/or any of a variety of other architectures. Thus, DMS 107 is not to be construed as being limited to a single environment, and other configurations, and architectures are also envisaged.

Illustrative Network Device

FIG. 2 shows one embodiment of a network device 200, according to one embodiment of the invention. Network device 200 may include many more or less components than those shown. The components shown, however, are sufficient to disclose an illustrative embodiment for practicing the invention. Network device 200 may represent, for example, DMS 107 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, flash drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC). Network device 200 also includes input/output interface 224 for communicating with external devices, such as a headset, or other input or output devices not shown in FIG. 2. Input/output interface 224 can utilize one or more communication technologies, such as USB, infrared, Bluetooth™, or the like.

The mass memory as described above illustrates another type of non-transitory computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media devices include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. As noted, such computer-readable storage media are non-transitory and are not to be misconstrued with communication media disclosed above in conjunction with FIG. 1.

As shown, data stores 254 may include a database, text, spreadsheet, folder, file, or the like, that may be configured to maintain and store various database data, global dictionaries, data mapping stores, universal primitives, or the like. In some embodiments, the databases stored within data stores 254 include mixed numeric and non-numeric data types. As an aside, it should be readily understood, that non-numeric data includes any forms of information that is not numeric. Data stores 254 may further include program code, data, algorithms, and the like, for use by a processor, such as central processing unit (CPU) 212 to execute and perform actions. In one embodiment, at least some of data and/or instructions stored in data stores 254 might also be stored on another device of network device 200, including, but not limited to cd-rom/dvd-rom 226, hard disk drive 228, or other computer-readable storage device resident on network device 200 or accessible by network device 200 over, for example, network interface unit 210.

The mass memory also stores program code and data. One or more applications 250 are loaded into mass memory and run on operating system 220. For example, an apparatus such as the above discussed non-transitory computer readable devices may have stored thereon computer-executable instructions that when loaded into mass memory may by executed by operating system 220 within network device 200 to perform operations.

Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include primitive manager 257, web services 256, and data management services (DMS) 258.

Web services 256 represent any of a variety of services that are configured to provide content, over a network to another computing device. Thus, web services 256 include for example, a web server, a File Transfer Protocol (FTP) server, a database server, a content server, or the like. Web services 256 may provide the content over the network using any of a variety of formats, including, but not limited to WAP, HDML, WML, SGML, HTML, XML, compact HTML (cHTML), extensible (xHTML), or the like.

In one embodiment, web services 256 may provide an interface for accessing and manipulating data in a data store, such as data stores 254, or the like. In another embodiment, web services 256 may provide for interacting with DMS 258 that enables a user to access and/or otherwise manage various database services that may be provided through network device 200.

DMS 258 provides database services for any of a variety of data, including, data that may include mixed numeric, and non-numeric data. DMS 258 may organize data using any of a variety of mechanisms and approaches, where the storage and organization mechanism and a way in which the data appears to a user may be different. In one embodiment, the data may be organized based on what the data represents, including, for example, into columns, rows, and various tables that might represent a business, its resources, costs, or the like. As used herein, the term "database," refers both to how a user might view the data and to a physical and/or logical materialization of that data in memory, storage, or the like, along with a software product for manipulating the data, its views, and storage of the data.

DMS 258 may employ any of a variety of software database products, including, but not limited to Oracle DBMS, Microsoft Structured Query Language (SQL) Server, IBM DB2. Open source DBMS MYSQL, or even a proprietary database software product. In one embodiment, DMS 258 may provide its own user interface for managing the data. In one embodiment, the interface may be accessed using any of a variety of mechanisms, including through web services 256. However, other mechanisms may also be used.

In one embodiment, DMS 258 may also be configured to determine common data types for at least some of the data stored within data stores 254, or other database storage environments. DMS 258 may then create a global dictionary map for common data types, enabling data stored within the database storage environments to employ globally accessible keys that enable access to the common data types. DMS 258 may employ a process such as described below in conjunction with FIG. 3 to perform at least some of these actions.

DMS 258 may further employ primitive manager 257 to manage data within its database environment. In one embodiment, primitive manager 257 may search various mixed numeric/non-numeric data fields for non-numeric data. Primitive manager 257 may then create universal primitives for at least non-numeric data that may be found. In one embodiment, the universal primitive may be a 64-bit data type representation using the IEEE-754 standard for doubles. In one embodiment, non-numeric data within the database may be represented by setting a first field within the 64-bit universal primitive to 0x7ff (HEX) to indicate that the data is non-numeric (i.e. not-a-number or "NaN"). Primitive manager 257 may also manipulate other fields within the 64-bit universal primitive to represent other characteristics of the data, including, a type of the data, a storage location/block/offset, a pointer to the data, or so forth, as used in step 408 of FIG. 4. Non-limiting, non-exhaustive examples of various UNIPs are illustrated in FIG. 6, described in more detail below. In any event, primitive manager 257 may then replace the data within the database with the universal primitive, such that subsequent queries performed on the data may take advantage of the universal primitives. Primitive manager 257 may employ a process such as described below in conjunction with FIG. 4 to perform at least some of its actions.

Generalized Operation

As discussed above, there is a desire to be able to make more efficient use of resources used for various database management environments. For example, many traditional approaches seek to compress the data stored within the database to reduce an amount of storage space used.

Another mechanism that is directed towards reducing resource requirements employs a dictionary compression approach, where long values are replaced with smaller ones, creating and separately employing a stored lookup table for mapping or translation of the values. For example, consider storage of a transaction table such as shown in Table 1 below.

TABLE 1

| Transaction | Date | Person | Amount |
|---|---|---|---|
| 77 | May 4, 2010 | BobZ | 32.73 |
| 78 | May 5, 2010 | BobZ | 883.01 |
| 79 | May 6, 2010 | Pete | $21.22 |
| 80 | May 9, 2010 | Pete | € 1,892.99 |
| 81 | May 10, 2010 | Pete | 123.22 |

In an uncompressed traditional SQL database, this data might be stored in a database similar to Table 1, reading left to right and then downwards in the table. Finding a value in the Person column on row X might involve something like:

```
string offset=table_base_address+(rownum*(sizeof
    (transaction)+sizeof(date)+sizeof(person)+sizeof
    (amount))+sizeof(transaction)+sizeof(date)
```

In a column store approach, memory access (and compression) might be obtained for many queries by storing the column values together. For uncompressed, simple storage, the string offset might be found using something like this:

```
String offset=person_base_address+(rownum*sizeof
    (person))
```

In a local dictionary type compression approach, the person column may, in one embodiment, be stored as shown in Tables 2-3:

TABLE 2

| Key | Value |
|---|---|
| 0 | BobZ |
| 1 | Pete |

TABLE 3

| Values By Row |
|---|
| 0 |
| 0 |
| 1 |
| 1 |
| 1 |

For large numbers of rows with lots of repetition, this may be an efficient storage mechanism, because, assuming the only two values in the column are BobZ and Pete, an individual row can be stored in a single bit, as opposed to each row requiring 4 ASCII letters that are 8 bytes each. Such a compression scheme may reduce data sizes by upwards towards 96%. However, rarely are there only two values in a column. However, 2 bits can store 4 possible values, 4 bits can store 16 ($2^4=16$), and so forth. As the size of the string values in this column are 32 bytes (e.g., 256 bytes), there is a lot of compression capability. However, because strings are rarely four letters long in typical tables, this may further increase the technique's effectiveness.

In "executable" compression—there might be little need to "decompress" the data out to its full size before executing logic against it. One objective includes not merely reducing the size of the data, but rather increasing performance when operating on the data. However, reducing the size of the stored data is a result of the subject innovations described herein. At least one reason for a performance increase may arise in part because when data is compressed, there may be less of a load over the network, and/or a decreased demand from a slow disk. More of the data can be cached in RAM. Also, more of the data can be cached/held within a CPU's L1/L2 cache. Thus, such techniques are expected to reduce query response time against large data sets by many orders of magnitude.

For heavily interrelated data, or for certain types of queries, such as those used by semantic or ontological data stores, performance of the system as a whole is often dependent upon looking up and correlating values between different columns. The above techniques help. However, what may happen quickly is that another table may be needed in the system, such as described in TABLE 4 below.

TABLE 4

| Employee | Manager |
|---|---|
| George | Pete |
| Pete | Zoey |
| Lisa | Zoey |
| BobZ | Pete |
| Paul | Pete |

Each of these columns may then be dictionary compressed, although it is not required. In any event, the following tables 5-6 may be generated:

TABLE 5

| Person Key | Person Value |
|---|---|
| 1 | George |
| 2 | Pete |
| 3 | Lisa |
| 4 | BobZ |
| 5 | Paul |

TABLE 6

| Manager Key | Manager Value |
|---|---|
| 1 | Pete |
| 2 | Zoey |

The resulting table (Table 7) may be stored (either directly like this, or in a column based layout).

TABLE 7

| Person | Manager |
|---|---|
| 1 | 1 |
| 2 | 2 |
| 3 | 2 |
| 4 | 1 |
| 5 | 1 |

Then, to find a manager of the person who logged transaction #78, the following actions may be performed:
1. Find which row transaction #78 is: Row 2
2. Find which person that is (compressed): Person #1
3. Look up who Person #1 is: BobZ
4. Find which Employee #BobZ is: Employee #4
5. Find which row Employee #4 is in: Row 4 (if the column is compressed these won't match)
6. Find the manager in Row 4: Manager #1
7. Find who manager #1 is: Pete If the query is complex and/or spans an entire graph of tables or relationships (as may arise in some semantic or ontological systems), there can be many more steps to be performed than these seven.

One issue that may arise is all of the bidirectional lookup tables (such as the ones matching Person #1 to BoBZ, and vice versa). The lookups may include a handful of sequential data accesses—even when the tables are completely in RAM, which may be expensive. If the lookup tables can't be stored in RAM (or aren't currently there because they haven't been loaded from the disk/network—or were swapped out to there), then this may be even more expensive.

Therefore, a global dictionary may be employed in order to discover relationships. In one embodiment, a large central hash map and the standard technique of object pointers may also be used for fast equivalency. Using object pointers may provide some execution benefits of dictionary compression while the column is in memory; but, memory pointers might not be persisted or otherwise kept consistent when the memory isn't accessed. This may provide the performance benefit, but may result in the uncompressed data needing to be stored to disk.

Therefore, the subject innovations disclosed herein introduces a notion of persistent global dictionary. In one embodiment, this persistence may be across all columns in the system. However, in other embodiments, the persistence may be across all columns and rows, or across rows. In addition to the performance advantages described above, because values in columns from different tables are directly comparable, the system can directly do lookups (or joins) across tables.

Global Dictionary Encoding

In one embodiment, an encoded global map may like this table 8, below.

TABLE 8

| ID | String |
|---|---|
| 1 | BobZ |
| 2 | Pete |
| 3 | George |
| 4 | Lisa |
| 5 | Paul |
| 6 | Zoey |

And as stored, the tables might like Tables 9-10.

TABLE 9

| Transaction | Date | Person | Amount |
|---|---|---|---|
| 77 | May 4, 2010 | #1 | 32.73 |
| 78 | May 5, 2010 | #1 | 883.01 |
| 79 | May 6, 2010 | #2 | $21.22 |
| 80 | May 9, 2010 | #2 | € 1,892.99 |
| 81 | May 10, 2010 | #2 | 123.22 |

TABLE 10

| Employee | Manager |
|---|---|
| #3 | #2 |
| #2 | #6 |
| #4 | #6 |
| #1 | #2 |
| #5 | #2 |

Using the above centralized, global dictionaries, the aforementioned algorithm for finding the department account code of the person who logged transaction #78, may now employ less steps. For example, at least the intermediate lookups are no longer necessary:

1. Find which row transaction #78 is: Row 2
2. Find which person that is (compressed): #1
5. Find which row #1 is in within the Employee/Manager table: Row 4
6. Find the manager in Row 4: #2
7. Lookup #2 is: Pete Steps 3 and 4 above are crossed-out to indicate that they are not performed. One embodiment of a process for creating global dictionaries, such as described above is described in more detail below, in conjunction with FIG. 3.

Numeric Columns

Consider the "Amount" column of the Table 1. Note that in this non-exhaustive, non-limiting example, the Amount column basically consists of numbers (although of different currencies)—and that they're all unique (in general, that there is only very rare duplication). Also, numbers typically have a much smaller representation inside a computer system than arbitrary strings do—all of those numbers will fit into a single 32 bit value.

A common query might be to ask "give me the total charges for Zoey's department". In this case, there may be a significant amount of addition. Any numeric representation that isn't in the CPU's native format (such as a 2's complement integer or an IEEE floating point) is likely to incur additional overhead that may include first transposing the number into the native format for execution, and then, invariably, back to the chosen representation for storage of the results. Therefore, it may be tempting to simply store the numeric data in its native format.

Unfortunately, in the real world, even such numeric data is often entered by humans and may be messy. Consider rows 3 and 4 of Table 1, which contain monetary values of $21.22 and € 1,892.99. While numbers, and in a column dominated by numbers, these values are exceptional cases with symbols in them that might not be stored inside a 2's complement integer or IEEE floating point. Further, such symbols can not be readily ignored, especially where there are meaningful differences. Therefore, it is often desirable to maintain the user input as it was entered, or treat Euros and dollars differently. For example, some implementations might convert Euros into dollars. However, in other embodiments such data differences may be represented instead as non-numeric data. Moreover, in one embodiment, such non-numeric data may be identified and converted to a universal primitive (UNIP). The universal primitives may then be uniquely identified based on a first field, for example. That is, at least non-numeric data within mixed data fields of numeric and non-numeric type of data may be stored using a universal primitive (UNIP) to identify the stored non-numeric data. The UNIP may take advantage of the IEEE-754 standard for floating point data representation by setting a first field within the UNIP to 0x7ff (HEX) to indicate that the data is non-numeric (NaN). In some embodiments, other fields may be manipulated to identify a type of data, a storage location, an offset, or the like. The UNIP may then replace the non-numeric (or even numeric) data within the database and subsequently be used during operations performed on the data.

One embodiment of a process useable to create UNIPs is described below in conjunction with FIG. 4. Moreover, as disclosed in FIG. 3, global dictionaries and UNIPs may be used together in a same database to provide reduced resource demand, and increased speed.

Figure 3:
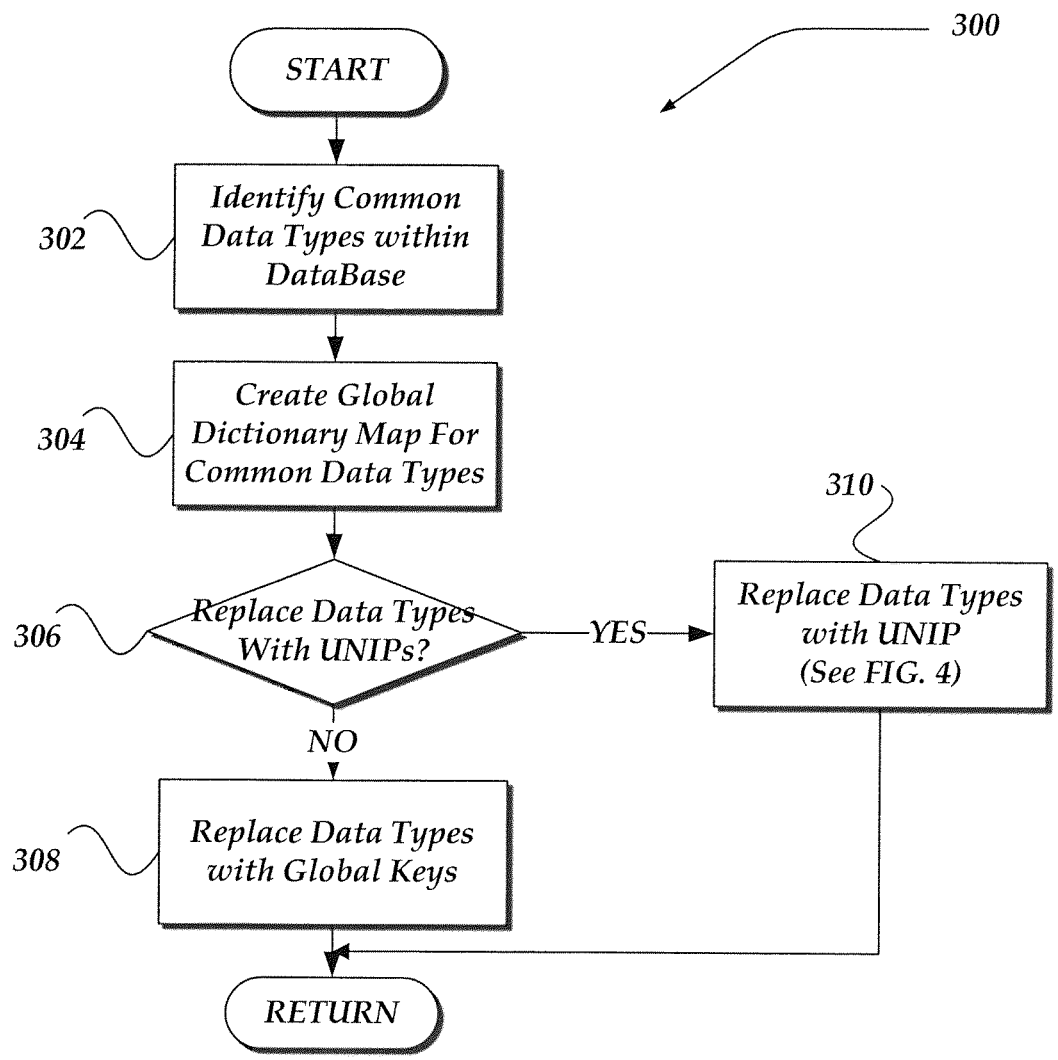
FIG. 3 illustrates a logical flow generally showing one embodiment of an overview process for use in determining global dictionaries for common data types within a mixed numeric and non-numeric database store.
Figure 4:
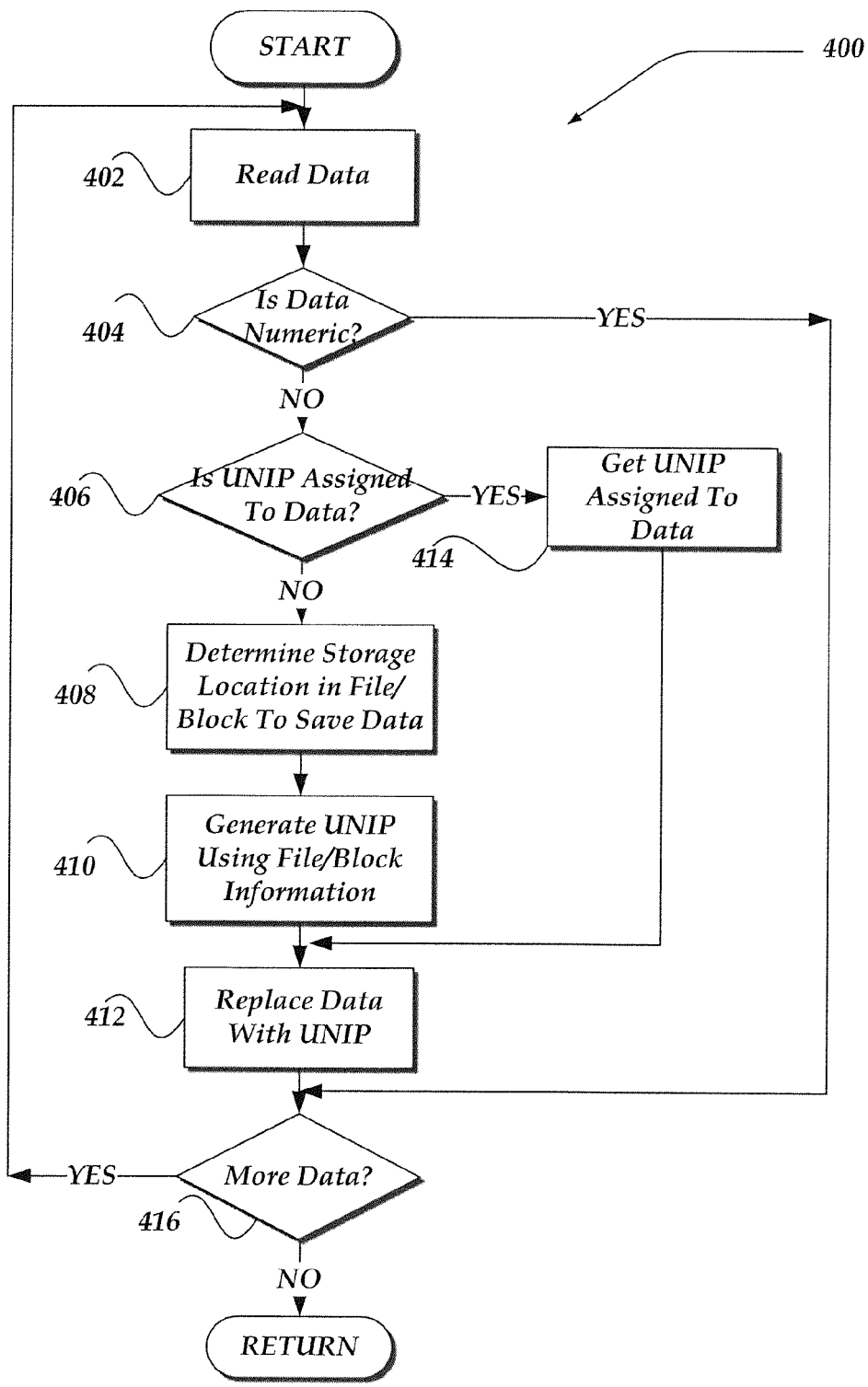
FIG. 4 illustrates a logical flow generally showing one embodiment of an overview process for use in determining universal primitives for non-numeric data.

Therefore, the operations of certain aspects of the subject innovation are now described with respect to FIGS. 3-4. FIG. 3 illustrates a logical flow generally showing one embodiment of an overview process for use in determining global dictionaries for common data types within a database store. The operations of process 300 of FIG. 3 may, in one embodiment, be performed within one or more network devices, such as DMS 107 of FIG. 1.

Process 300 of FIG. 3 begins after a start block, at block 302, where a database may be searched to identify possible common data types. In the above table examples, employees and managers may be considered to be common data types, as both include names of persons. While the above examples do not illustrate it, other common data types could also be identified based on various criteria. For example, business names, cities, or other characteristics of the data may be used to identify common data types. Thus, other common data types may also be identified. In other embodiments, block 302 may be optional, such that no common data type may be identified when creating a global dictionary.

Flowing next to block 304, global dictionaries are generated for the common data types. The common data types may be identified in the global dictionary using any of a variety of mechanisms. For example, in one embodiment, a common data may be found during a search of block 302; the found common data may then be copied to the global dictionary. In one embodiment, a key may be a sequential integer value usable to index and readily locate the data within the global dictionary. However, other key values may also be used.

Processing then flows to decision block 306 where a determination is made whether the common data values might be replaced with UNIPs. Such determination might be made based on whether the common data includes, for example, non-numeric data. In any event, if the common data values are to be replaced, processing flows to block 310. One embodiment of a process useable to replace the data types with a UNIP is described below in more detail in conjunction with FIG. 4, where, values for the common data may be selectively replaced with UNIPs. Processing then returns to a calling process to perform other actions.

If it is determined, at decision block 306, however, that the data is not to be replaced with UNIPs, processing flows to block 308, where the common data type's values are replaced with the global dictionary keys. Processing then returns to a calling process to perform other actions.

FIG. 4 illustrates a logical flow generally showing one embodiment of an overview process for use in determining universal primitives for non-numeric data and selectively replacing the data in a global dictionary with the UNIP. Process 400 of FIG. 4 may be performed within one or more network devices, such as DMS 107 of FIG. 1. Moreover, as noted above, process 400 may represent on embodiment of a process useable at block 310 of process 300 discussed above.

Process 400 begins, after a start block, at block 402, where data may be read from the database. As noted above, the data could also be read from within a global dictionary. In any event, processing then flows to decision block 404, where a determination is made whether the read data is numeric data, or non-numeric data. If it is determined to be numeric data, processing may flow to decision block 416 to determine whether there is more data to be read and evaluated; otherwise, if the data is non-numeric, processing continues to decision block 406.

At decision block 406, a determination is made whether a UNIP is already assigned to the read data. In one embodiment, such determination might be made by performing a search into a file store that is created for storing converted non-numeric data using UNIPs. If a match is found, then the process flows to block 414, where the already assigned UNIP is used to assign to the read data. Processing then flows to block 412; otherwise, if a UNIP match is not found, processing flows to block 408.

At block 408, a file location and offset is obtained within the file store useable for storing converted non-numeric data. In one embodiment, this file store may be located within a data store within network device 200, described above. In one embodiment, the file store may be allocated space that is arranged such that the numeric data may be concatenated "end-to-end" within the file store as a stream of data. In one embodiment, a file location may be an address into the data storage device to locate the file store, while an offset value may be to a next available location within the file store useable for concatenating a next non-numeric data value. In some embodiments, a plurality of files may be utilized to store the data. In one embodiment, a hash of the data may be generated to identify one of a plurality of files to store the data.

Continuing to block 410, a UNIP may be created using, for example, an error code for the IEEE-754. That is, a first field of the UNIP may identify the UNIP as non-numeric, using an IEEE 754 error code that indicates that the data is non-numeric. In one embodiment, the first field might be populated with the value 0x7ff (HEX) to indicate that the data is non-numeric (NaN). Other fields within the UNIP may also be populated to indicate for example, a type of the data, such as whether the data is a string, whether the data is a currency (and/or a type of currency), or any of a variety of other types of data that the system might desirable to identify and track. For example, other data types may also be identified, such as dates or lists or sets of values. Moreover, other fields within the UNIP may be used to identify a storage location/block/offset or so forth for the data. For example, a second field within the UNIP might be populated with a file storage address, and a third field within the UNIP might include an offset into the file storage, where the offset is an address offset from the file storage address. Other embodiments are described below in conjunction with a non-limiting example of UNIP initialization code.

In any event, the UNIP may then be used to replace the data within the database, at block 412. Proceeding to decision block 416, a determination is made whether more non-numeric data is to be evaluated for possible UNIP replacement. If so, processing loops back to block 402; otherwise, processing may return to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

In one embodiment, for database queries that may request an action on a field of data, the UNIP may be used to quickly identify whether an operation can be consistently applied over the data or whether at least some of the data might need to be converted, or have some other action performed upon the data. For example, in the tables discussed above, even though there is some non-numeric data, a query might not include operations on the non-numeric data. However, where the query includes operations upon mixed data, the UNIP may be employed to quickly access a presence of a non-numeric data, and to convert the data should it be needed. In one embodiment, non-numeric data may be represented as a UNIP and numeric data may be represented as the number (e.g. a double), which may enable a processor to process numeric data without accessing a conversion data store. Other operations might be quickly performed with the UNIP directly. Thus, for data comparisons, for example, the comparisons might be performed on the UNIPs rather than even seeking to access the non-numeric data itself. Thus, use of the UNIP is directed to further reducing performance overhead. For example, when cross-referencing any two tables in the system (such as in the 'generalized operation' 7-step process above), the raw data definition of "BoBZ" might not be accessed or used.

Another non-limiting, non-exhaustive example might include encoding of date and time data. A date can be represented in a more processor friendly format than a string representation, such as the usual machine format of "milliseconds since 1970". For example, within 50 bits of available space, dates through the year 37648 (specifically Wed May 6 15:07:22 PDT 37648) may be represented. With this encoding, when the system might want to know, for example, "date+5 days", the system can employ a process:
1. Convert from a UNIP back to a "milliseconds since 1970" format by masking against 0x8003ffffffffffff.
2. Add 432000000 (5 days in milliseconds)
3. Convert back to a UNIP using a bitwise OR against 0x7ffc000000000000 (which is the 0x7ff NaN high bits and also "01" bits for a type of "date". Clearly other inline encodings could be used.

This may be much more efficient than parsing the string version of the date from base storage, or even storing a pointer to the date in milliseconds.

Other Database types

As used herein, the term "database" refers generally to storage of data, as well as mechanisms for accessing that data. Thus, for example, the term database includes a columnar database system; a relational database system (RDBMS); a schema-less semantic store using a non-table-based representation, such as a Resource Description Framework (RDF) triple; or any of a variety of other structures useable for accessing and storing data in an organized manner.

Some Semantic or Ontological database systems may not encode data as "types" or "identifiers" directly, using traditional typing. That is to say, a particular property for a data item might not be tagged as a "number" or a "string" or a "date," or the like. Further, some systems tend to join many more disparate identifiers together during an average query. However, a universal primitive is directed towards improving operational efficiencies, at least because lookups may be more efficient and/or a priori typing (such as a declaration that a particular property is a number or a date) might not be required.

FIG. 5 illustrates the previous transaction/employee example 500 encoded in a semantic RDF, as a non-limiting, non-exhaustive model. Other than the full URI qualification of references between entities (such as the addition of the "http://apptio.com/em/" on the front of "BobZ"), the information contained is approximately the same. Further, the lookups used to answer the question of the manager of the person who logged transaction #78, more formally, the "tx:manager" of "http://apptio.com/tx/78" approximately follows the same lookup logic. In practice, columnar storage might be used to represent the above RDF graph, along with a column based dictionary.

Data Sizes

It should also be noted that, 64-bits may be a convenient and efficient choice for representation of a universal primitive as many off-the-shelf hardware is often designed to natively operate on 64-bit IEEE-754 floating point values. However, the subject innovations are not limited to this configuration, and other values may also be used. For example, where additional address space might be desired for a non-numeric data reference, it may be appropriate to extend (or shorten) the length of the universal primitive in order to accommodate other situations. For example, 32-bit and 128-bit floating point numbers may also employed. Thus, universal primitives as disclosed herein may be applied to these representations, as well.

Description of the UNIP Numeric Format

As discussed above, it may be desirable to encode multiple types of values into a single 64-bit value. By leaving IEEE-754 floating point numbers in their natural range, numerics can be natively operated on by properly configured hardware. This is because IEEE-754 floating point numbers may be used to define virtually any value starting with 0x7ff (except for 0x7ff0000000000000) as a different class of NaN (or "Not a Number"). The remaining 52 bits available within the different classes of NaN space may then be available for encoding additional information.

Within many programming languages, a NaN value may be used to represent certain invalid mathematical operations, such as the result of dividing by zero, or the like. For example, in the Java language, a single bit-pattern might be used for all classes of NaN's. In Java, for example, that pattern might be 0x7ff8000000000000. Nevertheless, in some embodiments, some masking hooks might be added so that other types of NaN's don't enter the UNIP type system. In Java, one embodiment might use a 'double' type for numerics and a 'long' datatype for UNIP encoded values. In other languages, such as C or C++, a typedef can be used to achieve the same static protection from a compiler.

Within the 52-bits available in the UNIP, different patterns are possible depending upon system characteristics. In some embodiments, 2 bits might be used for type, while the remaining 50 bits might be used for a type dependent value. For example, native types that may be encoded might include, Date (bit value: 01), Set (multiple other values, bit value 10) and String (bit value 11). The bit pattern 00 may then be used as an extended type system with fewer value bits (meaning that, for example, the next 3 bits are used for an additional 8 datatypes, leaving 47 bits for values). These extended datatypes could be used to represent Boolean values, Integers and other types of Enumerations. Further, within the 00 type bit pattern, some other "magic values" could be reserved, such as 0x7ff0000000000001 (for an "invalid" value), 0xfff0000000000000 (for null), 0x7ff0000000000000 (for 'uninitialized', which is used to mean "has not been calculated yet". In some environments, programmers may use a 'null' for uninitialized; however, a distinction may be made such that the initialized value results in null.

In some embodiments, other types may define an empty string (" ") as 0x7ff0000000000010 and an internal control result value of 0x7ff0000000000011 for 'try again', which could used when doing optimistic locking in multi-threaded situations to indicate to external algorithms to re-attempt the UNIP assignment because the previous attempt was transiently unsuccessful. Still other values may used for various types, including, but not limited to 0x7ff0000000000100L, 0x7ff0000000000101L, 0x7ff0000000000110L and 0x7ff0000000000111L.

Thus, non-IEEE 754 values stored in the UNIP may be behind a bit mask of 0x7ff0000000000000 (which is hex for a 64 bit pattern of 0111 1111 1111 0000 0000 0000 0000 0000 0000 0000 0000 0000 0000 0000 0000 0000). Again, other numbers of bits may be used. Further, the non-numeric type of the UNIP may be in the following 2 bits, behind a mask of 0x000c000000000000. However, other numbers of bits may be used. In addition, a type-specific value portion may be behind a mask of: 0x0003ffffffffffff.

Non-Limiting Data Types Examples:

The following provides examples of various example data types. However, other values, and/or data types may also be defined, and it is noted that the subject innovations are not limited or otherwise constrained to the examples discussed herein. Date: A date type (01) may be the 50 bits as a "milliseconds since epoch". This may be typical in some computer systems, although a 64-bit value may be used. Before the advent of 64-bit systems it was common to use a 32-bit value as the date, but might run out of space in 2038. A 64-bit value may permit dates for the next 292 billion years, while a 47 bit date might permit dates for the next 570 thousand years (specifically until Tue July 25 10:58:01 PDT 572823), which may be sufficient for many purposes.

1. String: A string type (11) may use the next 50 bits as follows:
   3 bits for which partition to use (giving 8 possible partitions). The partition may be used for concurrency, permitting multiple workers (either different threads on a same computer system, or entirely different machines or clusters of machines) to simultaneously service UNIP translation requests without requiring co-ordination between them. The partition may be assigned using a hashing function on the string, as is common.
   19 bits for which "block" to use (giving a maximum of 524,287 blocks).
   28 bits for the offset of the string bytes within the block (giving, in one embodiment, a maximum block size of 268 MB).

It should be readily apparent that different bit split positions can be used. For example, for a smaller number of strings under higher concurrency, some of the block bits might be taken and used to add additional partitions.

Further, while this strategy stores offsets within each block for performance reasons (for example, bitmask and addition algorithms may be used to obtain a pointer to the string data itself), if the number of strings to be stored is much larger, it might be appropriate to use sequential addressing instead—that is, a first string is "#1", the second is "#2", and so forth. This might use an array-style lookup table (one extra memory dereference) to process, but might be able to store many more strings within the same address space limitations. In such a sequential assignment strategy, the "block" bits aren't necessarily needed at all, meaning that all 47 bits (or more/less depending upon number of partition bits) could be used for strings, giving a theoretical maximum of 140 trillion strings.

2. Set: The set type (10) may be used as a type that holds other UNIP values. For example, it could store multiple strings, such as ("Bob", "Pete", "George"), or multiple numbers. In some embodiments, might use it as a mechanism to do multiple-key table joins with the same efficiency as single-key joins. The use of the 50 value bits may be roughly the same as for the string data type (above), except that the data at that location may be an array of other UNIP values.

It is possible to make additional tradeoffs on these bit-space decisions—for example, a larger value (128 bit) might provide more flexibility in address space, or using a less precise numeric (such as 32-bit floating point) achieves the same.

In any event, FIG. 6 illustrates non-limiting, non-exhaustive examples of some of the various UNIPs discussed above. It is important to note that these are merely examples, and other lengths, and structures may also be employed. As such, the subject innovations disclosed herein are not to be construed as being limited to these example illustrations.

Non-Limiting Examples of Operating on Universal Primitives

Encoding a Value to a UNIP

The following non-limiting example process can be used to encoding an arbitrary value into a UNIP. For example, in some embodiments, the following process may be used in conjunction with, or as one implementation of process 400 of FIG. 4 discussed above.

1. If the value is a NaN (any possible NaN), it is converted to the canonical NaN value of 0x7ff8000000000000L.
2. If the value is "invalid", return an error condition.
3. If the value is a number, return it directly. Thus, as discussed above, these steps may be used to determine at decision block 404 that the read data is numeric.
4. If the value is determined to be "special" (such as null or the empty string), an appropriate UNIP is assigned. For example, for null, the value of 0x7ff0000000000100L may be used, for the empty string, the value of 0x7ff0000000000010 may be used, or so forth. Such actions may be performed, for example, at block 410 of process 400.
5. If the value is a date or timestamp (or other direct value, such as a Boolean), use bitmasks to encode the value directly. A timestamp may, for example, be masked against 0x3ffffffffffffffL. Again, these actions may be performed at block 410 of process 400 above.
6. For data storing value types (such as strings or sets):
   a. Hash the value into partitions using any of a variety of hashing functions and modulo.
   b. Send the assignment request to that partition.
   c. The partition may use a hashmap to determine if a UNIP for that value is already assigned. If so, that UNIP is returned. Such determination may be employed, for example, at decision block 406 of process 400.
   d. Otherwise:
      i. Space is allocated at the end of a most recent block of data (or a new block created if necessary).
      ii. The value data is written into the block.
      iii. The block number and offset within the block are used to generate a new UNIP for this value, as discussed above at block 408.
      iv. The partition's hashmap is updated with this UNIP assignment.
      v. The new UNIP is returned. In one embodiment, this UNIP may be used to replace the data within the database, as discussed at block 412 of process 400.
7. For sets, the "value data" stored in step 6.d.ii above may comprise multiple UNIPs that are generated by running the above process on the set contents.

Decoding a Value from a UNIP

As discussed above, many database operations may be performed directly using the UNIP, rather than converting or decoding the UNIP back into the non-numeric value that it represents. However, when it is desirable to operate on the non-numeric value represented by the UNIP, the following may be used to convert the UNIP. It should be noted that the following represents one embodiment of a process for such conversion, and others may be used instead. The following may be performed by virtually any computing device operating on data within the database, including, any of client devices 101-105, and/or DMS 107 of FIG. 1.

The process may begin, after a start block, where:
1. If the UNIP is a number, return it directly (since numbers have the same binary format).
2. If the UNIP is canonical NaN (0x7ff8000000000000L), return NaN.

3. If the UNIP is "invalid" (0x7ff0000000000001), return an error condition.
4. If the UNIP is determined to be "special" (such as null or the empty string), return the appropriate value. For example, 0x7ff0000000000100 returns null, and 0x7ff0000000000010 returns the empty string.
5. Check the bits referring to the UNIP's type:
   a. For example, if the bits are 01 (for a date), use a bitmask to uncover the milliseconds-since-epoch value directly. (That is, mask against 0x3fffffffffffff).
   b. If the bits are 11 (for a string):
      i. Determine the partition number from the UNIP. Route the request to an appropriate partition manager (which may be a different thread or different machine or machine cluster)
      ii. The partition manager determines a block number and offset from within the UNIP value.
      iii. Read the string directly from the block at the specified offset and return it.
   c. If the bits are 10 (for a set), use the same algorithm as in step b) above, but the value read from the block/offset is a list of UNIP values that are each then decoded using this same algorithm. Note that the decoding of those UNIP's may be "lazy" (or done "on demand" by the process in order to reduce a runtime overhead of this process.

The above provides one non-limiting example, and as such, it should be recognized that other actions may also be performed, based on various UNIP types employed, or the like.

Temporary UNIP Assignment

When remote machines are used for UNIP assignment, there may a significant latency to requesting or looking up UNIP's. Batching the UNIP requests together can largely mitigate the throughput impact of this, but an additional strategy of assigning 'temporary' UNIP's can be used, permitting the system to continue processing in a slightly degraded state.

In some embodiments, a bit (possibly the type bit 00) may be used to indicate that a UNIP is not a 'global' UNIP, but is a temporary assignment. Values within that type bit can be assigned sequentially (or in per-thread blocks). When comparing UNIPs, then—if one or both of the parameters are temporary UNIPs, then the system compares the values instead of the UNIPs directly. Alternatively, the system can wait (stall) until the global UNIP assignment arrives. When the global UNIP assignment arrives, temporary UNIPs can be replaced.

Encryption

As non-numeric data are replaced with placeholder (UNIP) values, the system can largely operate on the data opaquely (without examining the values themselves). This permits efficient operation even if the data is encrypted on disk—as in some embodiments, the decryption can double access time to on-disk data, resulting in significantly slower system performance. With only the UNIP definitions encrypted, the rest of the system data may be un-interpretable without the UNIP definitions—even though processing can proceed on it at full speed, including processing on the UNIP values where that processing does not require decoding. For example, when a global dictionary in place, equality, inequality and joins do not require the UNIP to be decoded (and filtering or alphanumeric sorting still would require decoding to be done).

In other words—the UNIP values (data represented by the UNIP) may be encrypted, but the rest of the data in the system is stored directly (unencrypted)—yet the net effect is that the data is still secure as the 'unencrypted' data has had all identifiable information removed. That is, in one embodiment, the data represented by the UNIP is encrypted and a substitution of the UNIP in the data is used to remove identifiable information from the database. In some embodiments, numerics need not be encrypted in this scheme, which may provide a benefit to performance but may or may not be sufficiently secure.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a database for managing mixed numeric and non-numeric data;
   a storage device for storing the database, or other data; and
   a processor that is operative to perform actions, including:
      reading data within the database having mixed numeric and non-numeric data;
      generating one or more global dictionaries for read data having one or more common data types in the database, wherein each read data value for a common data type is copied to a global dictionary;
      when it is determined that the read data value for the common data type is non-numeric, performing further actions, including:
         creating a universal primitive (UNIP) having a first field indicating that the read data value is non-numeric, and at least a second field that identifies a storage location within the storage device for storing the read data value, wherein the UNIP is assigned to the read non-numeric data value, and
         replacing the read non-numeric data value within the database with the created UNIP, such that subsequent queries within the database manages queries using the UNIPs that replaced the read non-numeric data values having the common data types; and
      when it is determined that the read value for the common data type's values is numeric, replacing the common data type's values with one or more keys for the global dictionary.

2. The network device of claim 1, wherein the UNIP is implemented using a Institute of Electrical and Electronics Engineers (IEEE) Standard for Floating-Point Arithmetic (IEEE-754) by setting a first field within the UNIP to 0x7ff (HEX) to indicate that the data is non-numeric (NaN).

3. The network device of claim 1, wherein the one or more global dictionaries are employed for managing each of a plurality of UNIPs created for the read non-numeric data values determined within the database.

4. The network device of claim 1, wherein the read non-numeric data value identified by the UNIP is encrypted and a substitution of the UNIP is used to remove identifiable information from the database.

5. The network device of claim 1, wherein the processor that is operative to perform actions, further including performing at least one database operation on data within the database, wherein the operation is directly performed on the UNIP rather than on the read non-numeric data value represented by the UNIP.

6. The network device of claim 1, wherein the processor that is operative to perform actions, including:
   when the read data is non-numeric and is assigned to a previously created UNIP to represent it's read non-numeric data value, replacing this read non-numeric data value within the database with the previously created UNIP.

7. The network device of claim 1, wherein at least a portion of the UNIP is encrypted.

8. A system, comprising:
a storage device that stores a database having stored therein mixed numeric and non-numeric data;
one or more processors operative to perform actions, including:
reading data within the database having mixed numeric and non-numeric data;
generating one or more global dictionaries for read data having one or more common data types in the database, wherein a read data value for a common data type is copied to a global dictionary;
when it is determined that the read data value for the common data type is non-numeric, performing further actions, including:
creating a universal primitive (UNIP) having a first field indicating that the read data value is non-numeric, and at least a second field that identifies a storage location within the storage device for storing the read data value, wherein the UNIP is assigned to the read non-numeric data value, and
replacing the read non-numeric data value within the database with the created UNIP, such that subsequent queries within the database manages queries using the UNIPs that replaced the read non-numeric data values having the common data types; and
when it is determined that the read value for the common data type's values is numeric, replacing the common data type's values with one or more keys for the global dictionary.

9. The system of claim 8, wherein the UNIP is implemented using a Institute of Electrical and Electronics Engineers (IEEE) Standard for Floating-Point Arithmetic (IEEE-754) by setting a first field within the UNIP to 0x7ff (HEX) to indicate that the data is non-numeric (NaN).

10. The system of claim 8, wherein the global dictionary is employed for managing each of a plurality of UNIPs created for the read non-numeric data values determined within the database.

11. The system of claim 8, wherein the storage address further comprises a first address to the storage location and an offset address from the first address.

12. The system of claim 8, wherein the processors are operative to perform actions, further including performing at least one database operation on data within the database, and wherein the operation is directly performed on the UNIP rather than on the non-numeric data represented by the UNIP.

13. The system of claim 8, wherein the processors are operative to perform actions, including:
when the read data is non-numeric and is assigned to a previously created UNIP to represent it's read non-numeric data value, replacing the read non-numeric data value within the database with the previously created UNIP.

14. The system of claim 8, wherein the read non-numeric data value includes at least one of an alpha-numeric name, a date, or a currency indicator.

15. An apparatus comprising a non-transitory computer readable medium, having computer-executable instructions stored thereon, that in response to execution by a computing device, cause the computing device to perform operations, comprising:
reading data within the database having mixed numeric and non-numeric data;
generating one or more global dictionaries for read data having one or more common data types in the database, wherein a read data value for a common data type is copied to a global dictionary;
when it is determined that the read data value for the common data type is non-numeric, performing further actions, including:
creating a universal primitive (UNIP) having a first field indicating that the read data value is non-numeric, and at least a second field that identifies a storage location within the storage device for storing the read data value, wherein the UNIP is assigned to the read non-numeric data value, and
replacing the read non-numeric data value within the database with the created UNIP, such that subsequent queries within the database manages queries using the UNIPs that replaced the read non-numeric data values having the common data types; and
when it is determined that the read value for the common data type's values is numeric, replacing the common data type's values with one or more keys for the global dictionary.

16. The apparatus of claim 15, wherein the UNIP is implemented using a Institute of Electrical and Electronics Engineers (IEEE) Standard for Floating-Point Arithmetic (IEEE-754) by setting a first field within the UNIP to 0x7ff (HEX) to indicate that the data is non-numeric (NaN).

17. The apparatus of claim 15, wherein the global dictionary is employed for managing each of a plurality of UNIPs created for the read non-numeric data value determined within the database.

18. The apparatus of claim 15, wherein the storage address further comprises a first address to the storage location and an offset address from the first address.

19. The apparatus of claim 15, wherein the computing device to perform operations, further comprising: performing at least one database operation on data within the database, wherein the operation is directly performed on the UNIP rather than on the read non-numeric data value represented by the UNIP.

20. The apparatus of claim 15, wherein the computing device to perform operations, further comprising: when the read data value is non-numeric and is assigned to a previously created UNIP to represent the read non-numeric data value, replacing the read non-numeric data value within the database with the previously created UNIP.

* * * * *